Oscillating propellers.

NO PRINTED

BEST AVAILABLE COPY

H. Links.

Vibrating Propeller.

No. 209.

A. I. Patented Nov. 16, 1858.

Fig. 1.

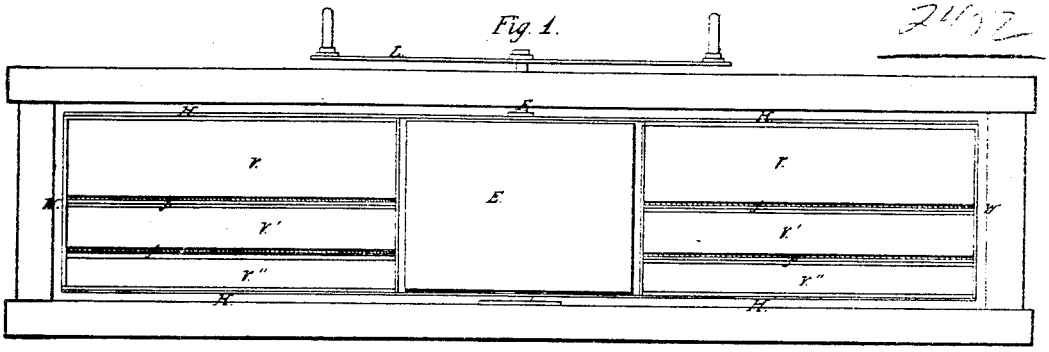

Fig. 2.

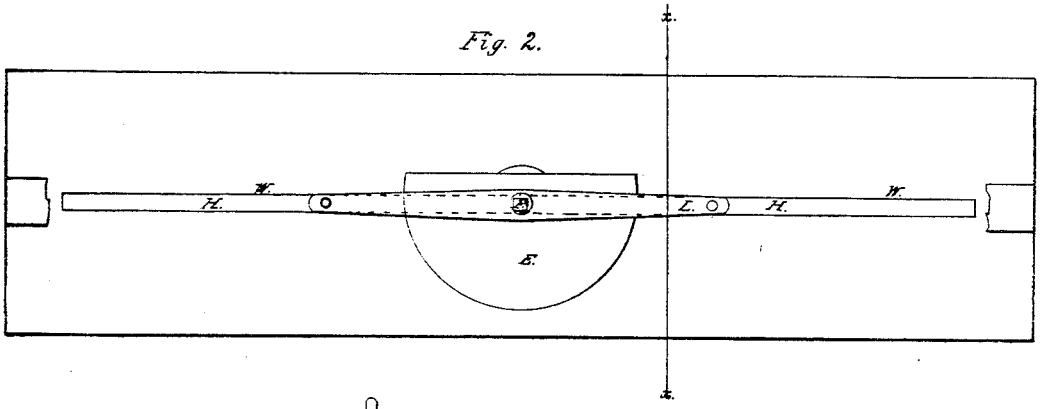

Fig. 3.

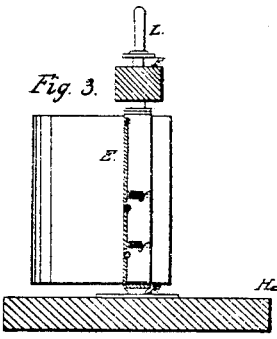

Fig. 4.

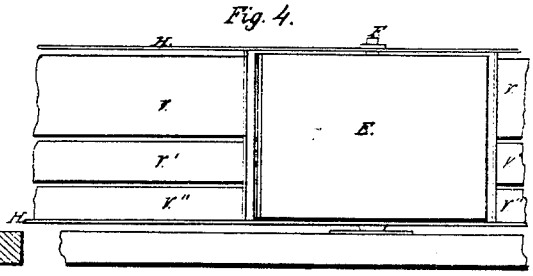

Witnesses,

Geo. Patten

Jas. Clay

Inventor.

Henry Link

No. 209, Re-issued Letters Patent No. 12,823.—For Improved Propeller.—Patented [illegible] V, made up of a series of horizontal hinged vanes [illegible] as described, in combination with the [illegible] E, either hollow or solid, substantially as [illegible] for the purpose [illegible]